United States Patent [19]
Casadevall

[11] 3,960,626  
[45] June 1, 1976

[54] METHOD OF MAKING HIGH PERFORMANCE ABLATIVE TAPE

[75] Inventor: James L. Casadevall, Orlando, Fla.

[73] Assignee: Martin Marietta Corporation, Orlando, Fla.

[22] Filed: Apr. 9, 1973

[21] Appl. No.: 349,906

Related U.S. Application Data

[60] Division of Ser. No. 105,135, Jan. 8, 1971, Pat. No. 3,726,751, which is a continuation-in-part of Ser. No. 672,673, Oct. 2, 1967, abandoned.

[52] U.S. Cl................................... 156/93; 156/181; 156/184; 156/189; 156/304; 156/330; 156/331; 156/335; 244/1 R; 428/105; 428/109

[51] Int. Cl.² .......................................... B32B 7/08

[58] Field of Search ............. 156/93, 180, 181, 189, 156/304, 426, 427, 330, 331, 335, 184; 161/89; 244/15 C

[56] References Cited
UNITED STATES PATENTS

| | | | |
|---|---|---|---|
| 2,614,936 | 10/1952 | Willits | 161/152 |
| 3,041,230 | 6/1962 | Diehl | 156/172 |
| 3,250,655 | 5/1966 | Adler | 156/181 |
| 3,275,489 | 9/1966 | Talv | 156/181 |
| 3,307,992 | 3/1967 | Condon et al. | 156/181 |
| 3,405,674 | 10/1968 | Coates et al. | 156/93 X |
| 3,479,244 | 11/1969 | Burnett | 156/181 |
| 3,687,776 | 8/1972 | Allard et al. | 156/181 |
| 3,700,527 | 10/1972 | Grosh | 156/174 X |
| 3,753,842 | 8/1973 | Pittman | 161/157 |
| 3,756,893 | 9/1973 | Smith | 156/93 X |

*Primary Examiner*—Edward G. Whitby  
*Attorney, Agent, or Firm*—Julian C. Renfro; Gay Chin

[57] ABSTRACT

A high temperature tape for use in protecting a structural item to be subjected to high temperature, and the method whereby this novel tape is made are set forth. The tape is principally constituted by a number of elongated carrier fibers disposed in an essentially aligned array, and a large number of comparatively short fibers disposed in a nonwoven manner essentially transversely to the elongated fibers. The short fibers typically extend beyond the confines of the carrier fibers, at least on one side, thus to create a pliable, fringed tape capable of being wrapped for a number of turns about an item to be protected. This wrapping may be done in such a manner that the fringe formed by the short orthogonally placed fibers is available to extend over and cover previous turns of the tape. The fibers are of temperature resistant material, and various means are provided for securing the short fibers to the elongated fibers, including the use of certain resins. If resin is used, it may be of a type that can be cured subsequent to the layup of a length of the tape into a desired configuration, such as a missile nose cone.

26 Claims, 6 Drawing Figures

METHOD OF MAKING HIGH PERFORMANCE ABLATIVE TAPE

CROSS-REFERENCE TO RELATED INVENTIONS

The present invention is a Division of the James L. Casadevall application Ser. No. 105,135 filed Jan. 8, 1976, now U.S. Pat. No. 3,726,751, issued Apr. 10, 1973, which was a Continuation-in-Part of the Casadevall invention "High Performance Ablative Material Construction," filed Oct. 2, 1967, Ser. No. 672,073, now abandoned. This invention also bears a definite relationship to another invention of James L. Casadevall, entitled "Cross-Fibered Tape, and Uses Thereof," which issued on Dec. 29, 1970 as U.S. Pat. No. 3,551,268.

BACKGROUND OF THE INVENTION

1. Field of the Invention

The present invention relates to the manufacture of high temperature resistant materials, and more particularly to a pliable, nonwoven tape suitable for use in the protection of missile nose cones, leading edges and the like.

In missiles, or for that matter, for any item to be subjected to high heating rates, a number of schemes have been devised for protecting the surface areas from the effects of high temperature. Of these, perhaps ablative materials which absorb the heat energy by vaporization, sublimation or by melting of a surface coating material to protect the missile and its instrumentation are the most commonly used. However, fluid cooling, in which a fluid absorbs the heat energy by a rise in the temperature of the fluid used; heat sinks of a nonmelting shielding material; and transpiraton cooling in which a vapor or gas is diffused through a porous skin onto the heated surface have also been suggested. The present invention deals with a novel ablative type material for a missile nose cone or the like, but it obviously may be used in many other utilizations where intense heating is to be experienced.

In nose cone technology, the temperature limitation involved in the proper protection of the structural shell and the components of the payload inside the shell is a most important factor. The most desirable ablative material is one with a high heat of ablation and a low thermal conductivity. However, various materials possess one or the other characteristic in different degrees and in addition, many of the materials that possess other desirable properties do not have the necessary structural strength. Materials must be selected on the basis of the minimum weight required to maintain the temperature within the design limits, and ablative materials must be matched to the environment in which they are to be used. For example, many materials rapidly deteriorate without ablating if exposed for a length of time to temperature below their ablation temperatures and thus will not provide protection for the structure when most needed. Commonly used ablative materials include quartz, graphite and teflon.

2. Description of the Prior Art

The majority of prior art ablative constructions used in missile nose cones have been made by a shingle wrap method in which a woven fiberglass or silica material is impregnated with a phenolic resin and wrapped upon the structure with a shingle type overlap. The resin in the impregnated fiberglass or silica is then cured by heating under controlled conditions. This type of ablator, however, tends to become irregular when the cured resin ablates away, and the exposed reinforcing fibers tend to melt out or come loose. It has been suggested to provide a fiberglass woven rug impregnated with a resin whereby the woven fibers may be placed normal to the exterior surface of the nose cone rather than parallel to the surface. This placing of the fibers perpendicular to the surface prevents the material ablating in an irregular manner and prevents the fibers from washing out of matrix as ablation takes place. However, it has been found that construction of fiberglass or other material woven in a rug-like manner and then impregnated with a resin and cured, is not an arrangement in which the reinforcing fibers can become thick or close-packed together for best operation, and does not allow sufficient freedom in aligning the fibers at preferred angles on the surface to which it is being applied.

Other ablative constructions include cast resins without fiber reinforcement or reinforcement with various materials such as honeycomb core. One suggested solution to the rapid heating problems encountered in nose cones involves the anchoring of a fiber pile to the surface of a nose cone with unimpregnated fibers protruding out of the anchoring base of epoxy resin or the like.

SUMMARY OF THE INVENTION

The present invention relates to a novel, nonwoven high temperature tape, and to a method for making same, which tape is highly suitable for use in protecting certain items such as missile nose cones and leading edges from the deleterious effect of high temperatures, such as the high temperatures involved during re-entry of a missile into the earth's atmosphere. The tape principally comprises a number of elongated carrier strands or fibers disposed in an essentially aligned array, and a large number of comparatively short fibers secured in a nonwoven manner essentially transversely to the carrier fibers. Because the short fibers are not woven into the carrier strands, they can reside in a desirably dense manner upon the elongated carrier fibers, yet be essentially uniformly spaced along such fibers. The cross fibers are designed to extend beyond the confines of the carrier fibers on either one side or both sides, with the tape constructed with the cross fibers extending from both sides in an essentially symmetrical manner oridinarily being used after the cross fibers on one side of the tape have been folded across. Both the folded tape and the nonsymmetrical tape made with the fibers extending beyond the carrier strands on only one side are designed to be used typically in the wrapping in a tight manner about an item to be protected from high temperature effects, with the carrier strands thus contributing in a very definite manner to the hoop strength of the layup. In both the nonsymmetrical tape and the folded symmetrical tape versions of this invention, the completed wrapping of the tape about the item to be protected is typically followed by the application of either resinous or nonresinous material, which is then cured by the application of temperature and pressure above ambient if such be appropriate, so as to complete the creation of an item that may be handled in a normal manner without undue concern over the item's structural integrity.

The novel method of making nonwoven tape in accordance with this invention may include the steps of securing cross fibers along the length of a plurality of carrier fibers or strands, which cross fibers may extend from both sides of the carrier fibers in a uniform, symmetrical manner, or extend in a nonsymmetrical manner from only one side of the carrier strands, with the cross fibers or strands extending beyond the carrier strands being available as the tape is wrapped about an item to be protected, to cover or enclose at least some of the previous turns of the tape about the item. During the manufacture of the tape, the cross fibers may be secured to the carrier strands by mechanical means such as stitching, or by the use of an adhesive, such as a suitable high temperature resin. The carrier fibers and cross fibers may each be preimpregnated with resin, which may be caused to soften slightly during the manufacture of the tape. After the layup has been completed, the entire outer surface of the tape-wrapped item may be covered with additional resin, or a nonresinous substance such as colloidal silica, carbon dispersions or other high carbon content material. The resin of the layup may be cured into the hardened state by placing the completed item in an environment such that it is exposed for the proper length of time to temperature and pressure suitable for the curing of the particular resin involved.

It should be noted that the tape manufactured in accordance with this invention may be applied to a mandrel designed to impart a suitable inner configuration to the layup, or alternatively the tape may be wrapped directly around the item to be proteced, such as around the nose cone structure.

If to be used in the protection of leading edges of control surfaces of aircraft or missiles, to prevent erosion by impact with rain or particles of dust or the like, the tape can be wrapped around the item, or else laid up flat for later forming to the required configuration.

Another utilization of my invention may involve the fabrication of an essentially flat layup of convolute construction, that can be cured into a configuration usable as antenna windows. This of course offers a maximum arrangement of end grain fibers, having much greater ablation resistance than normal woven materials inasmuch as less resin is included, and the resin that does remain in the layup is uniformly disposed.

It is therefore an important object of this invention to provide a high temperature tape for use in protecting a structural item that is to be subjected to high temperatures and/or erosive enviroments.

It is another important object of this invention to provide a novel method for fabricating a novel, nonwoven tape of high temperature fibers, which tape can be used in protecting items such as nose cones, that are to be subjected to high temperatures.

It is another object of this invention to provide a high temperature tape involving a number of elongate high temperature carrier fibers, with a large number of comparatively short fibers secured thereto in a nonwoven manner, so as to extend beyond the carrier fiber and thus be available to extend over and cover previous turns of the tape about an item to be protected.

It is yet another object of this invention to provide a nonwoven tape in which a large number of cross fibers utilized in the tape construction can be secured by a number of different arrangements to the carrier fibers of the tape, thus making possible the use of fibers that would have been too stiff to have been woven, and making possible a much denser fiber array than was possible in accordance with prior art techniques.

It is still another object to provide a novel tape that can be wrapped into a tightly wound configuration whose over-all disposition is essentially flat, with the cross fibers thus being disposed in an arrangement of very high density.

These and other objects, features and advantages of this invention will be more apparent from a study of the drawings in which.

Figure 2:
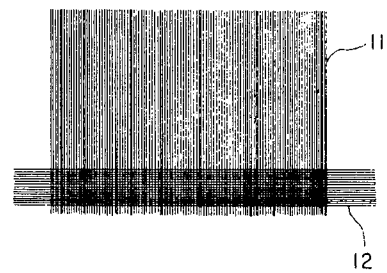
FIG. 2 is a plan view generally similar to FIG. 1, but showing a short section of an embodiment of a tape in which the cross fibers extend beyond the confines of the carrier fibers on only one side in a nonsymmetrical manner.
Figure 3:
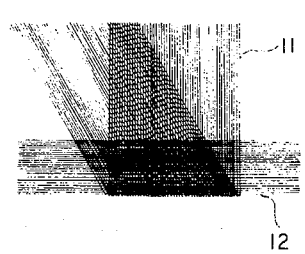
FIG. 3 illustrates a section of tape illustrating how the cross fibers utilized in conjunction with the embodiment of FIG. 1 may be folded.
Figure 5:
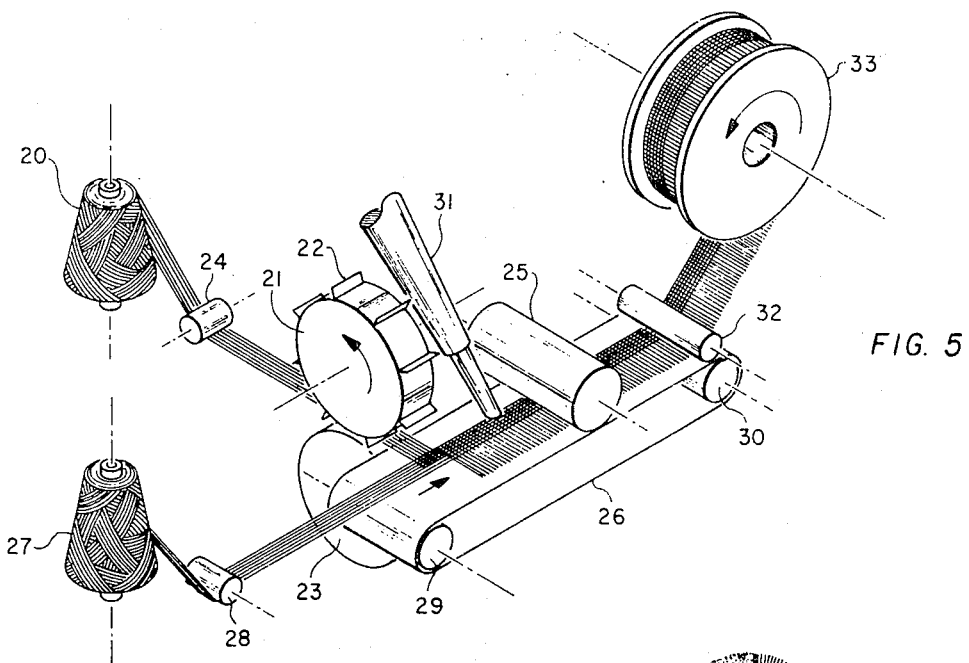
Figure 6:
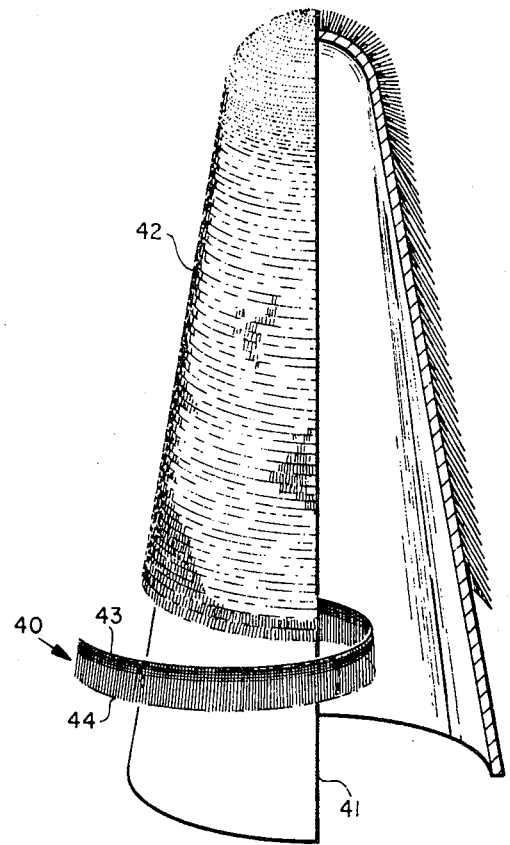

FIG. 5 illustrates a typical apparatus that may be used when manufacturing tape from preimpregnated fibers, involving the use of heating means for softening the resin, thus to cause the cross fibers to adhere in a nonwoven manner to the carrier fibers; and FIG. 6 illustrates a typical manner whereby the nonsymmetrical type tape illustrated in FIG. 2, or the folded tape of FIG. 3 may be wrapped on a mandrel configured in the general manner of a missile nose cone, or directly upon a nose cone.

DETAILED DESCRIPTION

Figure 1:
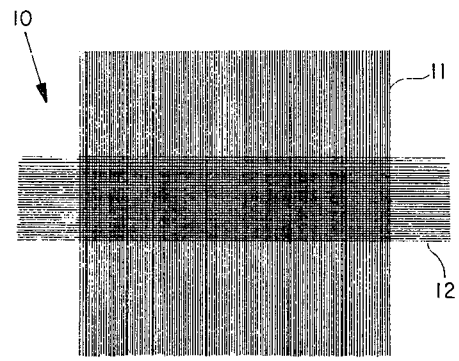
FIG. 1 is a plan view of a short section of a tape ape constructed in accordance with this invention, with the cross fibers extending essentially symmetrically beyond the confines of the carrier fibers on both sides.

Turning now to FIG. 1, it will there be seen that I have displayed a typical section of so-called fringe tape 10 constructed in accordance with the present invention, involving continuous strands or fibers 12 of substantial length, across which have been placed a number of comparatively short cross fibers 11, with the short fibers being secured to the elongate carrier fibers 12 in a nonwoven manner such as by stitching, or by the use of a suitable adhesive. The various procedures for securing the cross fibers in place on the elongate fibers 12 will be discussed at greater length hereinafter.

The fibers 11 and 12 are ordinarily made of the same material since it is desirable to utilize fibers of similar properties, especially with their melting points close to each other. As an example, these fibers can be of material such as fiberglass, graphite fiber, or fiber of silica, quartz, or carbon, but a combination of these such as of carbon and silica fibers may be used. It is significant to note that the fibers utilized in accordance with this invention may be materials which could not have been woven into a rug or cloth without excessive physical damage, but which may be satisfactorily utilized herein inasmuch as the bending of fibers in securing them together is largely eliminated.

FIG. 2 reveals an embodiment of this invention in which the cross fibers 11 are nonsymmetrically placed, in this instance being disposed essentially to one side of the carrier strands 12, with a substantial portion of their lengths extending beyond the confines of the strands 12. As will be seen hereinafter, the tape made of nonsymmetrically placed fibers is ideally suited for the manufacture of items such as nose cones, around which a large number of turns of tape may be wrapped, with the fringe formed by these fibers being available to extend over one or more previous turns of the tape about the item being protected. Significantly, this embodiment may use in addition to fibers of the usual high temperature materials, fibers made of a single or multiple crystal refractory or ceramic materal, which material can have suitable high temperature characteristics and extremely highly desirable physical properties, particularly flexural modulus, but which are too brittle to be woven, or folded in the manner described in conjunction with the use of the embodiment according to FIG. 1.

FIG. 3 illustrates a typical manner in which the generally symmetrical tape made in accordance with FIG. 1 may be folded before utilization, so that the fringes are disposed only on one side of the carrier fibers, and making possible the strong mechanical attachment of the fibers to an item to be protected. This advantage is brought about by virtue of the tight wrapping of the carrier strands around the item to be protected, which of course causes the cross fibers to be tightly bound, and unable to be displaced. This is extremely important in the instance that the cross fibers are of such materials as carbon or graphite, which do not normally develop high bond strengths with respect to the carrier fibers.

Figure 4:
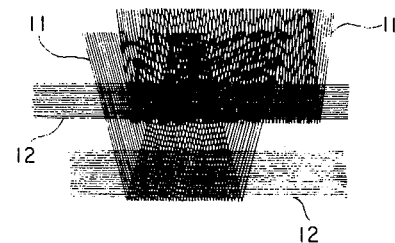
FIG. 4 illustrates how the folded tape arrangement in accordance with FIG. 3 may be doubled up for use in particular applications.

FIG. 4 illustrates how tape multilayering techniques can be used to provide a specialized construction, with a higher surface density of cross fiber ends, allowing the cross fibers to be placed essentially normal to a spherical surface or the like, since the outer portion of tape is necessarily thicker than the inner portion adjacent the surface involved. Two tapes are normally used in such an interfitted arrangement, but in certain extreme configurations, more tapes could be used.

Turning now to FIG. 5, I have there shown an arrangement for making tape of the type shown in FIGS. 1 through 4. A spool 20 is used to supply fibers that are to be cut into short lengths, whereas spool 27 is used to supply the carrier strands. A roller 24 may be used to guide and position the fibers to be cut, and roller 28 may be used to guide and position the carrier fibers. It should be noted that the fibers supplied from these spools can be essentially dry, with any resin or other adhesive used to secure the cross fibers to the continuous carrier strands being added as the cross fibers are placed in the proper position on the carrier fibers as shown in FIG. 5.

However, in accordance with a preferred embodiment of this invention, the fibers are preimpregnated with the resinous material being used to construct the tape.

The preimpregnated fibers being supplied from spool 20 are guided by the roller 24 so as to pass between a cutting wheel 21, and a wheel 23 such as of rubber that meets with the blades 22 disposed at spaced, equal distances about the circumference of wheel 21. Thus, the fibers passing between wheels 21 and 23 will be cut into comparatively short lengths by the blades 22 and then deposited on the carrier fibers, with the lengths of the short fibers being determined by the spacing of the blades. Alternate blades on the wheel 21 may of course be removed if desired to make the cross fibers longer. A typical length of the cross fibers is one inch, but this is merely illustrative and not to be construed as a size limit. Means (not shown) may be utilized to selectively move the carrier strands with respect to the rest of the apparatus shown in FIG. 5 when it is desired to go from the nonsymmetrical tape illustrated in this figure, to symmetrical tape of the general type shown in FIG. 1. This may be accomplished for example by moving the feed roller 28.

A flexible belt 26 rotatable around rollers 29 and 30 may be disposed below the carrier strands, and arranged to move at essentially the same speed as the carrier strands, thus to give support for these strands, and to enable a desired lateral spacing of the cross fibers to be achieved. Additionally, a pressure roller 25 may be used, which interacts with the belt 26, and serves to apply pressure to the locations where the cross fibers contact the elongate carrier strands, assuring intimate contact of the two. Only a small amount of pressure is ordinarily required, usually only about 15 pounds per square inch, which does not damage the fibers.

One type of preimpregnated fibers that may be used may be "Pluton" fibers, which are made by Minnesota Mining & Manufacturing Company of St. Paul, Minnesota. The resin with which such fibers may be impregnated may be a standard, high temperature phenolic resin, that has been partially cured to the so-called "B stage" to facilitate handling. Quite obviously the fibers could also be impregnated with certain epoxies, silicones, urethanes and the like.

In accordance with the apparatus of FIG. 5, I provide a heater, such as a heat gun or blower 31, or a heat lamp (not shown) that serves to heat the fibers at the point where the cross fibers are being placed on the elongate carrier strands. This heat arrangement serves to make the resin used in this embodiment sufficiently tacky that the cross fibers can be caused to firmly adhere to the carrier strands in the desired arrangement. In those cases where a flexible resin is used, a complete cure of the resin can be effected at this point. Also, a protective film (not shown) may if required be dispensed from a roll such that the film resides upon the cross fibers as they rest upon the carrier strands, thus preventing any displacement of the cross fibers as they pass between subsequent components of the apparatus, or any sticking of the tape to the pressure roll 25, the takeoff or guide roller 32, or to other layers during final winding of the just-completed tape onto the spool 33.

When preimpregnated tape is not being dispensed from the spools 20 and 27, I may apply adhesive to be used in securing the cross fibers to the carrier strands by means of a dispenser, dip bath or other suitable means. The dip bath if used may contain heated resin through which the carrier strands pass just before the cross fibers are disposed in the desired position across the carrier fibers.

If no "permanent" adhesive is to be used to secure the cross fibers to the carrier fibers, and stitching or other mechanical means is to be used to secure the cross fibers in the desired position, I may use a temporary adhesive to hold the cross fibers in the desired position, to prevent undesired displacement during such a stitching operation. Such a temporary adhesive may for example be a soluble thermoplastic material, which can if desired be removed by washing in a suitable solvent.

The machine for stitching the cross fibers to the elongate fibers may be disposed between the last belt roller 30 and the take up spool 33, or this could be performed as a secondary operation. No resin would be utilized in the embodiment where stitching is utilized.

Turning now to FIG. 6, I have there shown a generally conical structure 41 that may be regarded either as a mandrel, or as a substructure that is to be incorporated directly into a missile or aircraft. A large number of turns of tape or ribbon 40 constructed in accordance with this invention are wrapped around the structure 41, beginning either at the small end as shown in FIG. 6, or at the larger end.

In the ypical instance, tape would be wrapped upon the sturcture 41 beginning at the small end or tip, for this facilitates disposing the cross fiber ends normal to the surface, for maximum thermal advantage. It may be desired to cease such a wrap at such time as the forward portion of the structure has been covered, and then the wrapping of the structure completed by commencing from the large end, the wrapping of many turns of tape about the main portion of the structure. This of course enables the fringe portion of the tape to reside upon previously applied turns, thus increasing fiber density, and enabling optimum thermal properties to be achieved. The cross fibers reside at a comparatively low angle to the structure near the bottom or large end of the structure, where the thermal environment is less severe, and at a higher angle as the tip is approached.

A considerable amount of tension can be applied as the tape 40 is wrapped about the main portion of the structure, assuring intimate contact with such structure, and very satisfactory bonding without the application of external pressures of other types. For example, the completed structure could be cured in an oven without a pressure bag being necessary, and special attention paid only to the curing of the tip portion, where strand tension is not as effective.

As an example, tape prepared in the manner discussed in conjunction with FIG. 4 may be used at the tip portion of the structure 41, thus to simplify change of exposure angle and to assure high surface density, whereas the balance of the structure could be wrapped with tape made in accordance with FIG. 2 or FIG. 3, where a constant shingle angle is desired.

In applying the tape to the structure, secondary adhesives may be used to assure a satisfactory and permanent bond, and such adhesives may be high temperature phenolic or epoxy resin. If highly adhesive resins are used as the imprgenating material in tape of the preimpregnated type, no secondary adhesives are required because the pressure achieved during the wrapping of the elongate fibers 43 while applying considerable tension, brings about a squeezing out of sufficient resin to assure void free bonding of the tape to the structure.

It is of course possible to heat the cut fibers 44 to some extent during the wrapping procedure, thus to make the resin on the fibers tacky, and assuring dense contact between different layers of the tape. This may also be accomplished by the application of pressure by the use of rollers.

After the wrapping has been completed while using nonpreimpregnated tape, various resin or nonresinous materials that were not suitable for preimpregnating use may be applied to the completed fibrous layup by means such as brushing, vacuum impregnation, or dipping into a bath. Such resinous materials may include polyurethanes, while nonresinuous materials can include colloidal silica or carbon dispersions.

After curing of the completed assembly, standard machining operations can be performed to provide precise thicknesses and surface finish as specified.

I claim:

1. A method for fabricating a nonwoven tape of high temperature fibers for use in high temperature applications comprising the steps of forming a plurality of elongate carrier fibers into an essentially aligned array, securing thereon in a nonwoven manner, a large plurality of cross fibers disposed essentially perpendicularly to said carrier fibers, with said cross fibers extending beyond said carrier fibers on at least one side to form a fringe, thus to create a pliable high temperature tape which can thereafter be wrapped for a number of turns about an item to be protected, with the fringe of cross fibers extending beyond the confines of the carrier fibers being available to provide a covering for one or more previous turns of such tape, and wrapping the tape, with the fringe intact, around a generally circular means.

2. The method for fabricating a nonwoven tape as recited in claim 1 in which stitching is employed for securing the cross fibers and carrier fibers together.

3. The method for fabricating a nonwoven tape of high temperature fibers as defined in claim 1 in which an adhesive means are used for securing the cross fibers in a nonwoven manner to the elongate carrier fibers.

4. The method as defined in claim 3 in which said adhesive is a resin.

5. The method as defined in claim 4 in which said resin is a phenolic resin.

6. The method as defined in claim 4 in which said resin is an epoxy resin.

7. The method as defined in claim 4 in which said resin is polyurethane.

8. The method as defined in claim 4 in which said resin is a polymerizing phenolic resin.

9. The method as defined in claim 1 in which said fibers are graphite fibers.

10. The method as defined in claim 1 in which said fibers are quartz.

11. The method as defined in claim 1 in which said fibers are carbon.

12. The method as defined in claim 1 in which said cross fibers extend beyond the elongate fibers on both sides.

13. A method for producing a nonwoven tape of high temperature fibers comprising the steps of forming an array of elongate, essentially parallel securing fibers, secufing a large number of cross fibers in a substantially even distribution along the length of said carrier fibers, with said cross fibers being in essentially orthogonal relationship to said carrier fibers, said cross fibers being longer than the width of said carrier fiber array and being disposed so as to extend for a significant distance beyond at least one side edge of said carrier fiber array, such overhanging fibers being available to lend strength to a layup involving the tape being wrapped for a number of overlapping turns about an item to be protected.

14. The method as defined in claim 13 in which said cross fibers extend beyond the edge of said carrier fiber array on only one side.

15. The method as defined in claim 13 in which said cross fibers extend beyond the edge of said carrier fiber array on both sides.

16. The method for fabricating a nonwoven tape as recited in claim 13 in which stitching is employed for securing the cross fibers and carrier fibers together.

17. The method for fabricating a nonwoven tape of high temperature fibers as defined in claim 13 in which adhesive means are used for securing the cross fibers in a nonwoven manner to the elongate carrier fibers.

18. The method as defined in claim 17 in which said adhesive is a resin.

19. The method as defined in claim 18 in which said resin is a phenolic resin.

20. The method as defined in claim 18 in which said resin is an epoxy resin.

21. The method as defined in claim 18 in which said resin is polyurethane.

22. The method as defined in claim 18 in which said resin is a polymerizing phenolic resin.

23. The method as defined in claim 13 in which said fibers are graphite fibers.

24. The method as defined in claim 13 in which said fibers are quartz.

25. The method as defined in claim 13 in which said fibers are carbon.

26. The method as defined in claim 13, further comprising the step of wrapping the tape, with the overhanging fibers intact, around a generally circular means.

* * * * *